United States Patent
Nory et al.

(10) Patent No.: US 11,528,171 B2
(45) Date of Patent: Dec. 13, 2022

(54) METHOD AND APPARATUS INCLUDING ONE OR MORE PARAMETERS FOR DEFINING A MORE FLEXIBLE RADIO COMMUNICATION

(71) Applicant: Motorola Mobility LLC, Chicago, IL (US)

(72) Inventors: Ravikiran Nory, Buffalo Grove, IL (US); Vijay Nangia, Woodridge, IL (US); Robert T Love, Barrington, IL (US); Ravi Kuchibhotla, Gurnee, IL (US)

(73) Assignee: Motorola Mobility LLC, Chicago, IL (US)

( * ) Notice: Subject to any disclaimer, the term of this patent is extended or adjusted under 35 U.S.C. 154(b) by 141 days.

(21) Appl. No.: 15/675,271

(22) Filed: Aug. 11, 2017

(65) Prior Publication Data

US 2018/0049066 A1  Feb. 15, 2018

Related U.S. Application Data

(60) Provisional application No. 62/374,612, filed on Aug. 12, 2016.

(51) Int. Cl.
*H04L 27/26* (2006.01)
*H04W 76/10* (2018.01)
(Continued)

(52) U.S. Cl.
CPC .......... *H04L 27/2602* (2013.01); *H04L 5/003* (2013.01); *H04L 5/0053* (2013.01);
(Continued)

(58) Field of Classification Search
CPC ..... H04W 28/18; H04W 76/10; H04W 48/12; H04W 72/042; H04W 72/0453;
(Continued)

(56) References Cited

U.S. PATENT DOCUMENTS 8,199,632 B2   6/2012  Dapper et al.
10,531,467 B2 * 1/2020  Lin ..................... H04W 72/048
(Continued)

FOREIGN PATENT DOCUMENTS

EP    3174234 A1     5/2017
WO    2009135499 A1  11/2009
WO    2017123045 A1  7/2017

OTHER PUBLICATIONS

PCT International Search Report for PCT/US2017/046663, Motorola Mobility LLC, dated Oct. 2017.
(Continued)

*Primary Examiner* — Michael J Moore, Jr.
(74) *Attorney, Agent, or Firm* — Loppnow & Chapa

(57) ABSTRACT

A method and apparatus include establishing a communication connection with a communication network via an access point. As part of establishing a communication connection, information is received for defining a format of the communication connection. The format to be used as part of the communication connection includes one or more parameters which are received from the communication network when establishing the communication connection. At least one of the one or more received parameters serves to define a control channel transmission structure to be used as part of the format. A control channel including one or more control channel transmissions is then received in support of the established communication connection, based upon the control channel transmission structure defined by the at least one of the one or more received parameters.

25 Claims, 7 Drawing Sheets

(51) Int. Cl.
| | |
|---|---|
| *H04W 28/18* | (2009.01) |
| *H04L 5/00* | (2006.01) |
| *H04W 48/12* | (2009.01) |
| *H04W 74/08* | (2009.01) |
| *H04W 72/04* | (2009.01) |
| *H04L 25/03* | (2006.01) |
| *H04L 1/18* | (2006.01) |
| *H04W 74/00* | (2009.01) |
| *H04W 74/02* | (2009.01) |

(52) U.S. Cl.
CPC .......... *H04L 5/0082* (2013.01); *H04W 28/18* (2013.01); *H04W 48/12* (2013.01); *H04W 72/042* (2013.01); *H04W 72/0453* (2013.01); *H04W 74/08* (2013.01); *H04W 76/10* (2018.02); *H04L 1/1887* (2013.01); *H04L 1/1896* (2013.01); *H04L 5/0007* (2013.01); *H04L 25/03821* (2013.01); *H04L 27/26025* (2021.01); *H04W 74/002* (2013.01); *H04W 74/02* (2013.01)

(58) Field of Classification Search
CPC ... H04W 74/08; H04W 74/002; H04W 74/02; H04L 5/003; H04L 5/0053; H04L 5/0082; H04L 27/2602; H04L 1/1887; H04L 1/1896; H04L 5/0007; H04L 25/03821
See application file for complete search history.

(56) References Cited

U.S. PATENT DOCUMENTS

| | | | | |
|---|---|---|---|---|
| 10,772,092 | B2* | 9/2020 | Yoo ..................... | H04W 74/08 |
| 2007/0064669 | A1* | 3/2007 | Glasson ................ | H04L 1/1822 |
| | | | | 370/347 |
| 2007/0297540 | A1 | 12/2007 | Na et al. | |
| 2008/0056183 | A1 | 3/2008 | Gorokhov et al. | |
| 2009/0147735 | A1 | 6/2009 | Ghosh et al. | |
| 2009/0232071 | A1 | 9/2009 | Cho et al. | |
| 2009/0247172 | A1 | 10/2009 | Palanki et al. | |
| 2010/0061345 | A1* | 3/2010 | Wengerter ............. | H04L 1/0072 |
| | | | | 370/335 |
| 2010/0093384 | A1 | 4/2010 | Chun et al. | |
| 2011/0235601 | A1 | 9/2011 | Yoo et al. | |
| 2012/0076071 | A1 | 3/2012 | Kim et al. | |
| 2013/0201925 | A1* | 8/2013 | Li ........................ | H04L 27/2646 |
| | | | | 370/329 |
| 2014/0192753 | A1 | 7/2014 | Jang et al. | |
| 2015/0016316 | A1* | 1/2015 | Zhang .................. | H04W 72/042 |
| | | | | 370/280 |
| 2015/0173054 | A1 | 6/2015 | Ohta et al. | |
| 2016/0352551 | A1 | 12/2016 | Zhang et al. | |
| 2017/0208475 | A1 | 7/2017 | Yi et al. | |
| 2017/0325250 | A1* | 11/2017 | Manolakos ......... | H04L 27/2602 |
| 2017/0332396 | A1* | 11/2017 | Liao .................... | H04L 27/2607 |
| 2017/0366311 | A1* | 12/2017 | Iyer ..................... | H04B 7/0482 |
| 2018/0048422 | A1* | 2/2018 | Park .................... | H04B 1/70735 |
| 2018/0048436 | A1* | 2/2018 | Park .................... | H04L 5/0007 |
| 2018/0049204 | A1* | 2/2018 | Nory ................... | H04W 76/10 |
| 2018/0062817 | A1* | 3/2018 | Cheng ................. | H04L 5/1469 |
| 2018/0097673 | A1* | 4/2018 | Nangia ............... | H04L 27/2613 |
| 2018/0254794 | A1* | 9/2018 | Lee ..................... | H04L 5/0007 |
| 2018/0279388 | A1* | 9/2018 | Miao ................... | H04W 76/10 |
| 2019/0116609 | A1* | 4/2019 | Feng ................... | H04W 72/042 |

OTHER PUBLICATIONS

PCT International Search Report for PCT/US2017/046664, Motorola Mobility LLC, dated Oct. 30, 2017.

ZTE Corporation et al., "On forward compatibility for new radio interface", R1-164292, for 3GPP TSG-RAN WG1 Meeting #85, Nanjing, China, May 23-27, 2016.

Huawei et al., "Discussion on frame structure for NR", R1-164032, for 3GPP TSG RAN WG1 Meeting #85, Nanjing, China, May 23-27, 2016.

Motorola Mobility, "Signalling framework to enable flexible Frame Structure for NR", R1-167632, for 3GPP TSG RAN WG1 #86, Gothenburg, Sweden, Aug. 22-26, 2016.

Huawei et al., "Evaluation methodology discussion for 5G waveform", R1-162148, for 3GPP TSG RAN WG1 Meeting #84bis, Busan, Korea, Apr. 11-15, 2016.

ZTE Corporation et al., "Frequency multiplexing of different numerologies", R1-164273, for 3GPP TSG RAN WG1 Meeting #85, Nanjing, China, May 23-27, 2016.

Samsung, "Guard band Considering Inter-Numerology Interference", R1-1612445, for 3GPP TSG RAN WG1 Meeting #87, Reno, USA, Nov. 14-18, 2016.

Huawei et al., "Considerations on different guard band for mixed numerologies", R4-1609412, for 3GPP TSG RAN WG4 Meeting #81, Reno, USA, Nov. 14-18, 2016.

* cited by examiner

| SYMBOL + GP SAMPLES | GP EXTRA | SS |
|---|---|---|
| 2048+128 | 16 | 15 |
| 1024+64 | 8 | 30 |
| 512+32 | 4 | 60 |
| 256+16 | 2 | 120 |
| 128+8 | 1 | 240 |

FIG. 4

METHOD AND APPARATUS INCLUDING ONE OR MORE PARAMETERS FOR DEFINING A MORE FLEXIBLE RADIO COMMUNICATION

FIELD OF THE APPLICATION

The present application relates generally to a method and apparatus for establishing a communication connection with a communication network, and more particularly, to the receipt of one or more parameters including parameters which serve to define a control channel transmission structure, and/or the nature of a resource allocation.

BACKGROUND

Presently, user equipment (UE), such as wireless communication devices, communicate with other communication devices using wireless signals, such as within a network environment. Network environments often involve one or more sets of standards, which each define various aspects of any communication connection being made when using the corresponding standard within the network environment. Examples of preexisting standards include Long Term Evolution (LTE), Universal Mobile Telecommunications Service (UMTS), Global System for Mobile Communication (GSM), and Enhanced Data GSM Environment (EDGE).

In at least some preexisting standards including LTE, a small number of combinations for control, and download and/or upload transmissions were initially envisioned. Accordingly, certain initial "frame structure types" and frame structures were explicitly specified and signaled to the UE. During later LTE evolution stages, new requirements motivated a need for defining additional frame structure (FS) types and redefining existing FSs and signaling approaches. New RAT (NR) a developing standard that is expected to succeed LTE is not only envisioned to address a much broader range of use cases, deployment scenarios, frequency bands (below 6 GHz as well as above 6 GHz) when compared to LTE, but is also expected to be future compatible to currently non-envisioned scenarios.

The present inventors have recognized that having only predefined explicit definitions for one or more frame structures may not be suitable for some developing standards, such as NR. Instead, it would be beneficial to have a more generic signaling framework, that can be used to realize many "frame structures" without requiring the explicit enumeration of each possible frame structure in advance. As part of a more generic signaling framework, an ability to adjust the control channel transmission structure would be beneficial. An ability to adjust a resource allocation including an ability to define the presence and location of guard subcarriers in support of a resource allocation would also be beneficial. It would be beneficial to incorporate such features as part of the development of a new standard. It would also be beneficial to incorporate such features into an already existing standard.

SUMMARY

Presently, user equipment, such as wireless communication devices, communicate with other communication devices using wireless signals. According to a possible embodiment, a device can establish a communication connection with a communication network via an access point. As part of establishing the communication connection, the device can receive information for defining a format of the communication connection. The format to be used as part of the communication connection can include one or more parameters which are received from the communication network when establishing the communication connection. At least one of the one or more received parameters can serve to define a control channel transmission structure to be used as part of the format. The device can then receive a control channel including one or more control channel transmissions in support of the established communication connection. The received control channel can be based upon the control channel transmission structure defined by the at least one of the one or more received parameters.

According to another possible embodiment, a transceiver of a user equipment, can send and receive signals between the user equipment and a communication network entity, which includes information for defining a format of a communication connection. A controller of the user equipment can identify one or more parameters from the information for defining the format of the communication connection. At least one of the one or more received parameters serve to define a control channel transmission structure. The transceiver can further receive a control channel as part of the communication connection, the control channel including one or more control channel transmissions in support of the communication connection, based upon the control channel transmission structure defined by the at least one of the one or more received parameters.

According to another possible embodiment, a communication network can designate at least one of one or more parameters, which can serve to define a control channel transmission structure to be used as part of a format of a communication connection established with a device. The one or more parameters can be sent to the device as part of establishing the communication connection. The communication network can then send a control channel including one or more control channel transmissions in support of the established communication connection. The sent control channel can be based upon the control channel transmission structure defined by the at least one of the one or more sent parameters.

According to another possible embodiment, a controller in a communication network can designate at least one of one or more parameters, which can serve to define a control channel transmission structure to be used as part of a format of a communication connection established with a user equipment. A transceiver in the communication network can send the one or more parameters to the user equipment as part of establishing the communication connection. The transceiver can further send a control channel including one or more control channel transmissions in support of the established communication connection. The sent control channel can be based upon the control channel transmission structure defined by the at least one of the one or more sent parameters.

These and other objects, features, and advantages of the present application are evident from the following description of one or more preferred embodiments, with reference to the accompanying drawings.

BRIEF DESCRIPTION OF THE DRAWINGS

FIG. 4 is an example of inserted guard samples within a symbol mapping for multiple numerologies, where each of the multiple numerologies can include different subcarrier spacing;

DETAILED DESCRIPTION OF THE PREFERRED EMBODIMENT(S)

Figure 1:
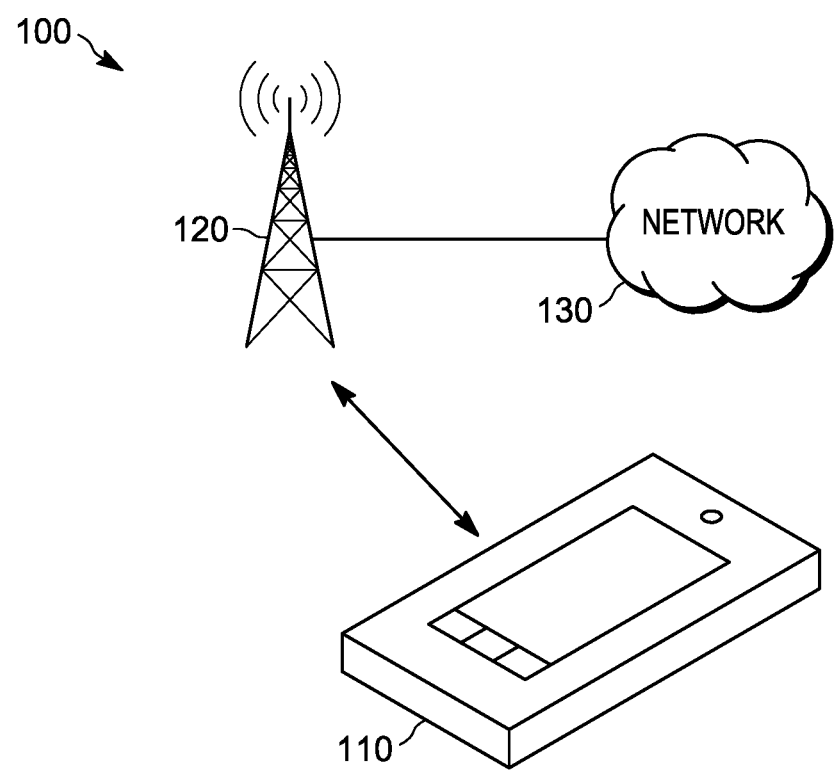
FIG. 1 is a block diagram of an exemplary network environment in which at least some of the present disclosed embodiments can operate.
Figure 2A:
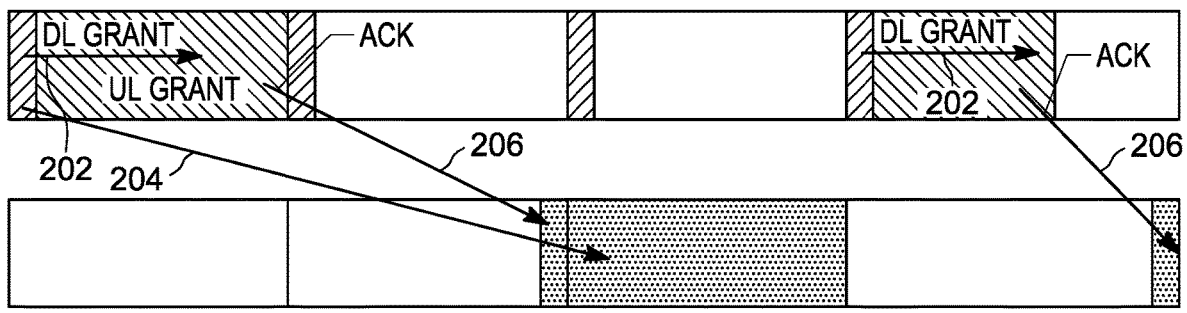
FIG. 2 includes subparts FIG. 2A.
FIG. 2B.
FIG. 2C.
FIG. 2D, which are each an example in a flexible frame structure or format of a communication connection for one of a paired carrier and an un-paired carrier for use within a communication standard.
Figure 2B:
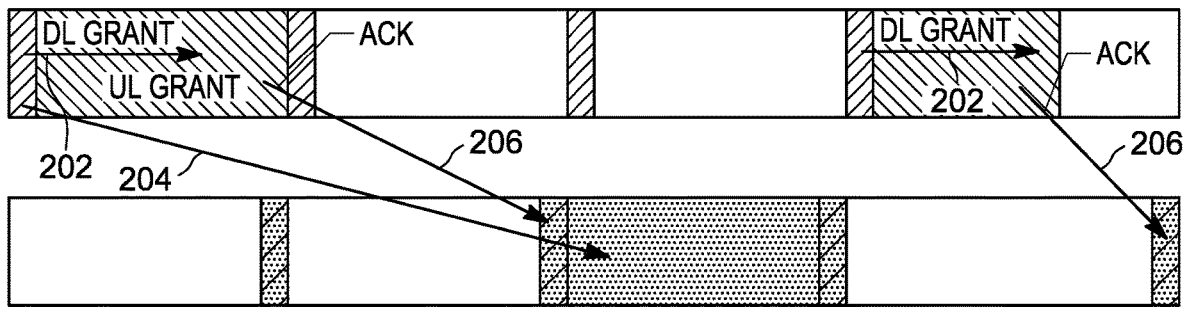
Figure 2C:
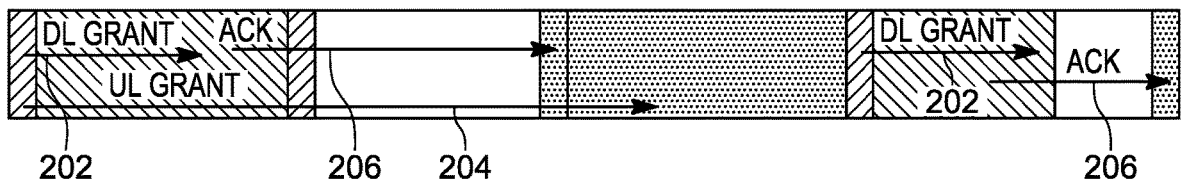
Figure 2D:
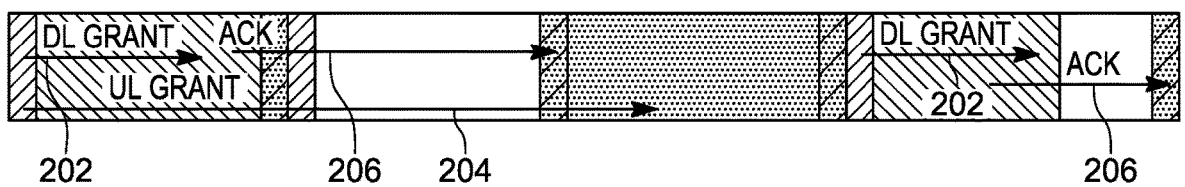

While the present disclosure is susceptible of embodiment in various forms, there is shown in the drawings and will hereinafter be described presently preferred embodiments with the understanding that the present disclosure is to be considered an exemplification of the invention and is not intended to limit the invention to the specific embodiments illustrated.

Embodiments provide a method and apparatus for receiving one or more parameters for defining a more flexible radio communication, such as parameters which serve to define a control channel transmission structure, and/or the nature of a resource allocation.

FIG. 1 is an example block diagram of a system 100 according to a possible embodiment. The system 100 can include a wireless communication device 110, such as User Equipment (UE), a base station 120, such as an enhanced NodeB (eNB) or next generation NodeB (gNB), and a network 130. The wireless communication device 110 can be a wireless terminal, a portable wireless communication device, a smartphone, a cellular telephone, a flip phone, a personal digital assistant, a personal computer, a selective call receiver, a tablet computer, a laptop computer, or any other device that is capable of sending and receiving communication signals on a wireless network.

The network 130 can include any type of network that is capable of sending and receiving wireless communication signals. For example, the network 130 can include a wireless communication network, a cellular telephone network, a Time Division Multiple Access (TDMA)-based network, a Code Division Multiple Access (CDMA)-based network, an Orthogonal Frequency Division Multiple Access (OFDMA)-based network, a Long Term Evolution (LTE) network, a 5th generation (5G) network, a 3rd Generation Partnership Project (3GPP)-based network, a satellite communications network, a high altitude platform network, the Internet, and/or other communications networks.

As noted previously, the present inventors have recognized that a more generic signaling framework, that can be used as part of a newly developed or an already existing standard to realize many "frame structures" without explicitly enumerating, or having predefined each possible frame structure in advance, may be beneficial. Details of such a signaling framework, in accordance with at least one embodiment, for a UE to transmit/receive data using flexible frame structures, are as follows. A "frame structure" may be referred to as a frame format or format of a communication connection. The format of a communication connection may be defined within a generic or reference frame structure framework.

The exemplary signaling framework can include synchronization signals and primary broadcast channel(s). Both the synchronization signals and the primary broadcast channel(s) can have similar periodicity as LTE discovery signals. These signals and channels may not necessarily be always transmitted, or some of the signals/channels may not be transmitted as in for example carrier in an unlicensed band requiring Clear Channel Access (CCA) or Listen Before Talk (LBT) to sense the carrier is free or limits on transmission duration and duty cycle when CCA/LBT is not required. Both the synchronization signals and the primary broadcast channel(s) are used by the UE to obtain timing and essential system information (eSI) from the network.

The synchronization signals may follow a pre-specified transmission pattern known to the UE.

In addition to the synchronization signals, additional broadcast channel related demodulation reference signals (BCH-DMRS) that are self-contained within primary broadcast channel transmission(s) can also be provided to the UE for demodulating the primary broadcast channel(s).

The precoding/beamforming/antenna port used for synchronization signals and BCH-DMRS signals may be different.

The synchronization signals and primary broadcast channel(s) may follow a default numerology having a default subcarrier spacing, and/or a default cyclic prefix length, or may follow a numerology from a set of default numerologies. The default numerology may be dependent of the carrier frequency band. For example, a carrier band below 6 GHz, a carrier band within a 6-30 GHz range, and a carrier band within a 30-70 GHz range may each have different default numerologies.

Essential system information (eSI) can indicate the transmission structure of the downlink (DL) control channel.

For example, the eSI can signal that the DL control channel should be monitored in the first x orthogonal frequency division multiplexing (OFDM) symbols of every yth subframe for a particular class of UEs. The set of x OFDM symbols may not necessarily be the beginning x contiguous OFDM symbols and more generally may be a portion of the subframe and may be distributed in the subframe. The position of the x OFDM symbols for monitoring control and the value of x may also vary from a first subframe to a second subframe according to a predetermined pattern. Alternatively, the eSI can signal that the DL control channel should be monitored in a first set of PRBs of every yth subframe for a particular class of UEs. For example, physical resource blocks can include a plurality of subcarriers. In at least some embodiments, the plurality of subcarrier can correspond to 12 subcarriers. The position of the first set of physical resource blocks (PRBs) for monitoring control, and the number of PRBs in the first set may also vary from a first subframe to a second subframe according to a predetermined pattern. The predetermined pattern may be based on a cell identification, a system identification, a hypercell identification, a beam identification, a transmission/reception point (TRP) identification obtained from the synchronization signals and/or the broadcast channel. The predetermined pattern may be based on parameter(s) signalled in the eSI.

By "subframe", a reference is made to a time domain container spanning a fixed number of OFDM symbols. The term 'subframe' may also used for describing something more. For example, the term 'subframe' may refer to a particular set of signals/channels present within the container. On a related note—by "TTI", a reference is made to the duration in which the UE can receive/transmit a transport block from higher layers. This terminology is assumed in the rest of the document.

DL control channel related demodulation reference signals (DLCCH-DMRS) that are self-contained within the DL control channel transmission(s) are provided to the UE for demodulating the DL control channels. The DLCCH-DMRS may be common/non-precoded reference signals or pre-coded/beamformed reference signals in which case the same precoding/beamforming is applied to the reference signal and the DL control channel transmissions.

eSI may signal the default or fallback numerology for the control and data transmission on the carrier. The default numerology may be different for DL and uplink (UL).

DL data assignments can be sent to the UE using the DL control channel. Parameters related to data reception, such as TTI length, resource block (RB) assignment, modulation coding scheme (MCS)/transport block (TB)-size, DMRS pattern related information for decoding data, number of spatial transmission layers, diversity and/or spatial multiplexing scheme, precoding information, hybrid automatic repeat request (HARQ) information, timing relation between DL control channel and data, timing relation between data and acknowledgment (ACK) transmission, ACK resource, ACK format, can be signaled to the UE in the DL control channel.

Considering control channel overhead, it may not be feasible to transmit all the transmission related parameters in the DL control channel. Therefore, similar to LTE, various 'transmission modes' can be defined such that the UE can use a set of preconfigured parameters, which can be determined from 'transmission mode', in addition to the dynamically signaled parameters to determine its more exact data reception structure.

The transmission modes (TMs) can be used for providing variable levels of flexibility. For example in one TM TTI length, time between DL control and data, timing between data and ACK are fixed and not sent in the DL control channel, for example similar to LTE. In other TMs some or all of these parameters are signaled in the DL control.

UL grants can be sent to the UE using the DL control channel. Parameters related to data transmission, such as TTI length, RB assignment, MCS/TB-size, DMRS pattern related information for transmitting UL data, number of spatial transmission layers, diversity and/or spatial multiplexing scheme, precoding information, HARQ information, timing relation between DL control channel and UL data, transmission of channel state information (CSI) and/or sounding reference signals (SRS), timing relation between data and earliest UL ACK transmission or UL (re-)transmission scheduling for the same HARQ process, are signaled to the UE in the DL control channel.

Similar to DL, UL transmission modes can be defined so that the UE can use a set of preconfigured parameters, determined from 'UL transmission mode', in addition to the dynamically signalled parameters to determine its exact UL data transmission structure.

A pattern of pre-reserved time instances for UL transmission can also be indicated to the UE via broadcast signaling.

For example, the eSI can signal that the last x' symbols of every y'th subframe are pre-reserved for UL transmission.

The UL transmission may not necessarily be from the UE. When such signaling is provided, the UE can assume that at least those time instances are used for UL transmissions. However, the eNB is free to schedule UL transmissions outside the indicated predefined time instances. More generally, the eNB may pre-empt and schedule DL data transmission via the DL data assignments in the DL control channel on the pre-reserved UL symbols by explicitly indicating to the UE to override the reservation. For example, the eNB may pre-empt the pre-reserved assignment of UL symbols, when the pre-reserved UL symbols are unused, in order to to improve system efficiency. In absence of such a signaling, the UE is expected to receive DL transmissions only outside the pre-reserved resources.

This signaling can be optional. Since this information is not strictly essential for DL reception, it is also possible to indicate this in a later system information (SI) transmission instead of eSI, such as an SI transmission scheduled via the DL control channel, similar to LTE system information blocks (SIBs).

In addition to pre-reserving time instances for UL transmission, this signaling can be used more generically to reserve any time instances not used for NR DL transmission, such as time resources for a back-haul transmission, sidelink etc.

FIG. 2 shows some example "Frame structures" that can be realized using the signaling framework described above. More specifically four examples are shown including (A) a paired carrier, without predefined UL; (B) a paired carrier, with predefined UL; (C) an un-paired carrier, without predefined UL; and (D) an un-paired carrier, with predefined UL. A paired carrier configuration can include a pair of carriers, which can be alternatively associated with UL and DL. An un-paired carrier configuration can use the same carrier for both UL and DL.

In at least some instances, one or both of a downlink grant 202 and an uplink grant 204 can be assigned, as part of a corresponding control channel transmission, as well as an indication regarding the location and timing of any expected corresponding acknowledgement 206.

Figure 3:
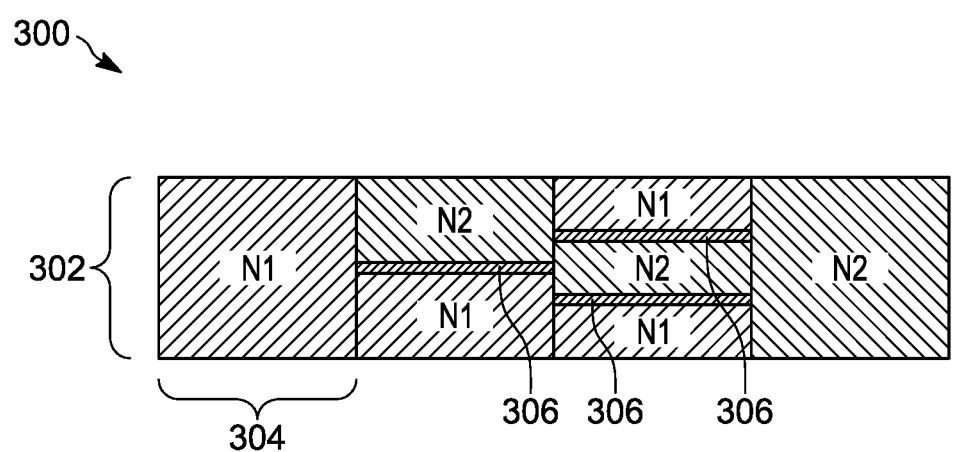
FIG. 3 is an example of support for different numerologies on the same subcarrier, which can provide for the inclusion of guard subcarriers between the different numerologies.

Another aspect of the present disclosure is the capability to support waveforms with different numerologies, such as OFDM waveforms generated with different subcarrier spacing values, on the same carrier. To enable support for multiple different numerologies on the same carrier, mechanisms that support co-existence between the waveforms can be beneficial. FIG. 3 shows an example 300 of frequency division multiplexing (FDM) of waveforms with different numerologies N1 and N2 on the same carrier 302. In at least some instances a carrier bandwidth of 20 MHz is possible. Further, it may be possible and desirable for the nature of the assignment of the different numerologies to vary between different subframes 304. In the illustrated embodiment, an example of four different assignments corresponding to four different subframes is shown. In at least some instances a subframe can have a duration of 1 ms.

FDM multiplexing of two numerologies on the same carrier can be achieved by using 'LTE-like' OFDM waveforms and Inter carrier interference (ICI) can be handled and/or reduced by leaving out guard subcarriers 306 in a transition region between the two numerologies.

For example, in FIG. 3, transmission of OFDM waveforms with two different subcarrier spacing values N1 and N2 is shown on the same carrier. For example, the first numerology N1 could incorporate a subcarrier spacing of 15 kHz and the second numerology N2 could incorporate a subcarrier spacing of 60 kHz.

It may be beneficial for guard subcarriers to be set aside for both N1 and N2. Alternately, guard subcarriers may be needed on only one of the multiplexed numerologies, such as the numerology with the narrower or smaller subcarrier bandwidth.

No transmissions are made on guard subcarriers. This can be achieved by setting the transmission power on those carriers to 0.

In accordance with at least one embodiment, it is envisioned that guard subcarriers could be accounted for during resource allocation. For an eNB implementation, it may be possible for an eNB to simply not allocate boundary RBs to any UE to create guard frequency regions. Furthermore, the inclusion of guard subcarriers by the eNB could then be signaled to the UE. For example, the eNB could signal through a DL resource allocation to the UE and within the resource allocation, an indication as to whether there are any guard subcarriers. The UE could then skip those guard subcarriers during a resource element (RE) mapping. In such an instance, it may be beneficial for the UE to know a) the location of guard subcarriers relative to one or more resource blocks (i.e., top edge, bottom edge, both edges) and b) how many guard subcarriers are used. For example, relative to a particular resource block, guard subcarriers could be located along a top edge, a bottom or both edges, and the number of guard subcarriers being used at each location may depend on what numerologies are being combined. Furthermore, in the same or other instances, the number of guard subcarriers being used may depend on the MCS level in use.

It may be possible for the location of guard subcarriers to be dynamically signaled, while the number of guard subcarriers being used at each location may be configured at a higher-layer. For example, radio resource control (RRC) could configure 4 guard subcarriers, and 2 bits in the UE's DL assignment can be used to say 00-no guard, 01-guard on top edge, 10-guard on bottom edge, 11-guard on both edges. Alternatively, RRC may configure a ratio of number of guard subcarriers to the number of allocated subcarriers in the resource allocation which the UE uses to determine the number of guard subcarriers.

This approach can also be extended for the case of different number of guard subcarriers at different edges. This can typically happen for cases with 3 different numerologies on the same carrier.

It may be further possible to address potential inter-cell interference due to different numerologies. Generally, symbol sizes are different between different numerologies, N1 and N2. It may be possible to make the symbol sized for the different numerologies integer multiples of each other.

For example, UE1 is assigned RB1-RB10 in cell 1 using numerology N1. UE2 is assigned the same RBs in neighboring cell cell 2 using numerology N2. If cell 1 and cell 2 are synchronized, each symbol of transmission to UE1 may interfere with multiple symbols, such as four symbols, of the transmission to UE2.

Assistance signaling can be sent to the UEs so that they can determine the numerology of the interference and use it for advanced interference cancellation receivers. Inter-eNB coordination, such as via X2-like signaling between different eNBs, can be done so that the different numerologies are preferably used in a coordinated manner between the eNBs. For example, eNBs could share a first preferred RB range for transmission using a first numerology, and a second preferred RB range for transmission using a second numerology.

It may be further possible to promote ICI reduction through the use of guard samples. In at least one embodiment, Extra guard period samples could be inserted at specific locations depending on the subcarrier spacing as shown in FIG. 4 for each numerology in the same network, or network region, or cells, or cell sites, or carrier, or aggregated carriers, or carrier set as configured by high level signaling.

The example includes 15, 30, 60, 120, and 240 kHz subcarrier spacing on the same carrier(s) using inserted guard sample at specific locations as indicated by '1' and '2' labels 402. The '1' and '2' labels indicate that 1 guard sample or 2 guard samples, respectively, are inserted into the payload, TTI, or subframe.

In the example illustrated in FIG. 4, the inserted guard samples occur on the symbol boundaries for a reference numerology which in this case corresponds to the numerology with the lowest subcarrier spacing.

By controlling the location and number of guard subcarriers, the Inter-eNB coordination of the use of different numerologies including the use of assistance signaling, and the inclusion of guard samples, inter-carrier interference resulting from the use of multiple numerologies within a common carrier bandwidth can be s addressed.

Figure 5:
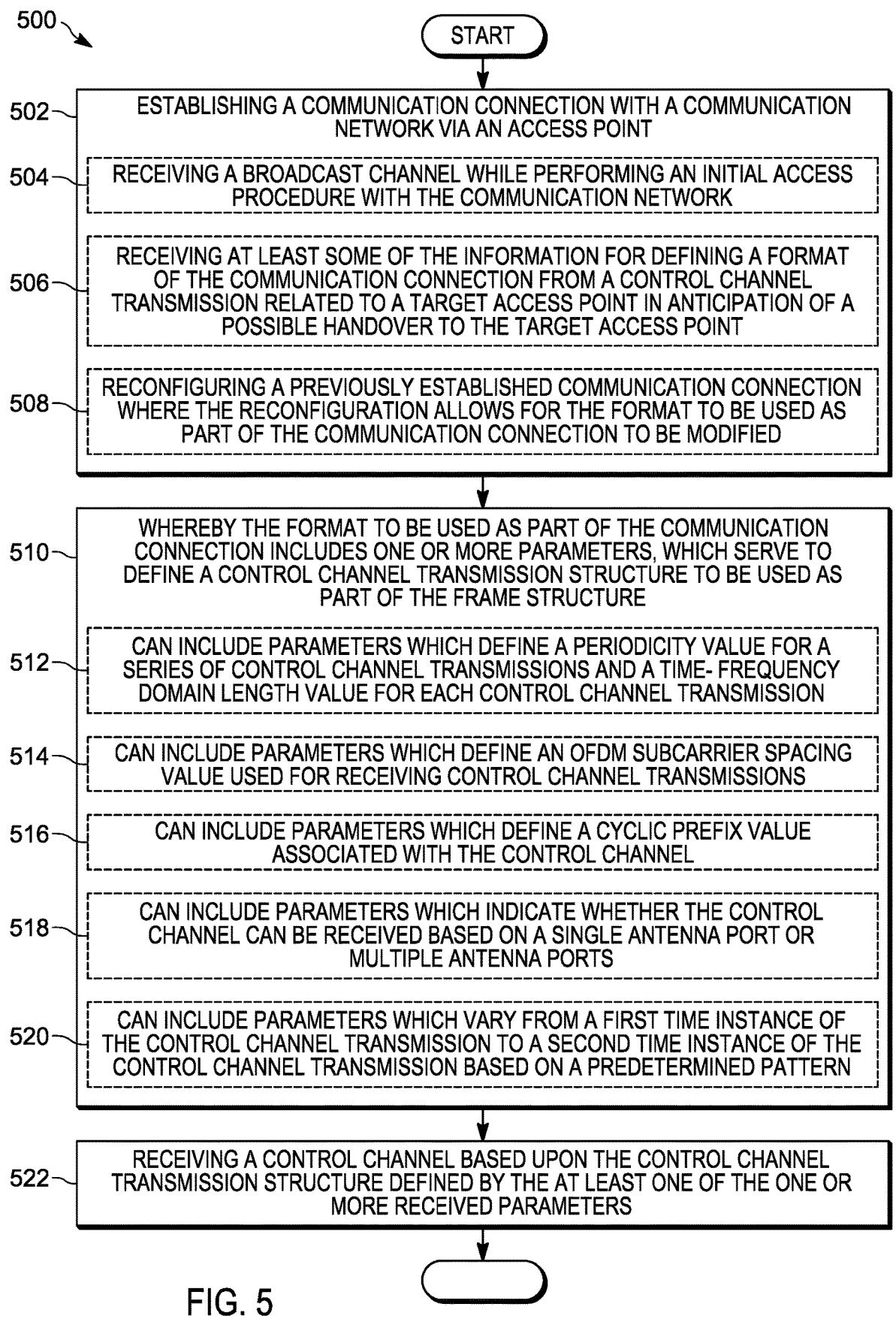
FIG. 5 is a flow diagram for receiving one or more parameters from the communication network for defining a control channel transmission structure, in accordance with at least one embodiment.

FIG. 5 illustrates a flow diagram 500 for receiving one or more parameters from the communication network for defining a control channel transmission structure, in accordance with at least one embodiment. The flow diagram illustrates the operation of a wireless communication device, such as the UE 110, according to at least one possible embodiment. At 502, a communication connection with a communication network is established via an access point including receiving information for defining a format of the communication connection. In at least some instances, as part of establishing the communication connection with the communication network, a broadcast channel is received 504 while performing an initial access procedure with the communication network. In at least some instances, as part of establishing the communication connection with the communication network, at least some of the information for defining a format of the communication connection including the control channel transmission structure, which is determined from one or more parameters included as part of control information is received 506 from a control channel transmission related to a target access point in anticipation of a possible handover to the target access point. In at least some instances, as part of establishing the communication connection with the communication network, a previously established communication connection is reconfigured 508, where the reconfiguration allows for the format to be used as part of the communication connection to be modified, so as to define a different format having a different control channel transmission structure.

The format to be used as part of the communication connection includes one or more parameters which are received from the communication network when establishing the communication connection 510, wherein at least one of the one or more received parameters serve to define a control channel transmission structure to be used as part of the format. A control channel is then received 522, based upon the control channel transmission structure defined by the at least one of the one or more received parameters.

In at least some instances, the at least one of the one or more received parameters, which serve to define the control channel transmission structure to be used as part of the format includes one or more parameters, which define a periodicity value for a series of control channel transmissions and a time-frequency domain length value for each transmission of the one or more control channel transmissions 512. In at least some of these instances, the periodicity value can comprise an integer multiple of subframes where a subframe comprises a plurality of orthogonal frequency division multiplexing (OFDM) symbols, and the time-frequency domain length value comprises a set of OFDM symbols and a set of physical resource blocks; and wherein at least one of the set of OFDM symbols, number of OFDM symbols, the set of physical resource blocks, and number of physical resource blocks is different from a first subframe of the control channel transmission to a second subframe of the control channel transmission.

In at least some instances, the at least one of the one or more received parameters, which serve to define the control channel transmission structure to be used as part of the format includes one or more parameters, which define an OFDM subcarrier spacing value used for receiving control channel transmissions 514. In at least some instances, the at least one of the one or more received parameters, which serve to define the control channel transmission structure to be used as part of the format includes one or more parameters, which define a cyclic prefix value associated with the control channel 516. In at least some instances, the at least one of the one or more received parameters, which serve to define the control channel transmission structure to be used as part of the format includes one or more parameters, which indicate whether the control channel can be received based on a single antenna port or whether the control channel can be received based on multiple antenna ports 518.

In at least some instances, the at least one of the one or more received parameters which serve to define the control channel transmission structure can vary from a first time instance of the control channel transmission to a second time instance of the control channel transmission based on a predetermined pattern 520. The predetermined pattern can be based on one or more of identification information determined from a received synchronization signal, and at least one of the one or more received parameters that is not varying based on the predetermined pattern. In at least some instances, a time instance can correspond to a subframe, such that a first time instance can correspond to a first subframe and a second time instance can correspond to a second subframe.

In instances where an initial access procedure is performed 504, at least some of the information for defining the format of the communication connection including the control channel transmission structure can be determined from the received broadcast channel. In some instances, a numerology for receiving control channel transmissions can be different from a numerology used for receiving the broadcast channel, wherein a numerology comprises one or more of a subcarrier spacing and a cyclic prefix length. It is further possible that a set of time-domain resources where downlink transmissions are not present can be determined from the broadcast channel. It is still further possible that a set of time-domain resources for uplink transmission can be determined from the broadcast channel. In at least some instances, a set of time-domain resources for uplink transmission can include a pattern of pre-reserved time instances. The set of time-domain resources for uplink transmission can also be defined by one or more of a number of symbols and a periodicity at which the number of symbols are defined to occur.

It is further possible that a scheduling assignment in the control channel could be received, and that data could be received using the scheduling assignment. More specifically, a set of time-domain resources where downlink transmissions are not present could be determined from the broadcast channel, where receiving data can further comprise receiving data outside the determined time domain resources where downlink transmissions are not present.

Receiving a broadcast channel, in at least some instances, can include determining an OFDM subcarrier spacing value used for receiving the broadcast channel, wherein the OFDM subcarrier spacing value is determined based on the operating band in which the broadcast channel is received.

Receiving a broadcast channel, in at least some instances, can include using a first set of reference signal transmissions; receiving the control channel using a second set of reference signal transmissions, wherein the first and second set of reference signal transmissions are transmitted on different antenna ports. The first set of reference signal transmissions can be received within OFDM symbols comprising the broadcast channel. The broadcast channel can be received using a synchronization signal transmission.

In at least some instances, the method can further provide receiving information regarding default numerology for at least one of control channel scheduling data, or data transmission on the control channel, where the default numerology comprises a default subcarrier spacing and a default cyclic prefix length. In some instances a default numerology could alternatively relate to a fallback numerology. It is further possible, that the default numerology for downlink transmissions from the access point to the device can be different than the default numerology for uplink transmissions from the device to the access point.

In at least some instances, information received on the control channel can include information regarding one or more preconfigured timing relation parameters for data transmission, wherein the preconfigured timing relation parameters includes at least one from the set of a timing relation between downlink control channel and downlink data, a timing relation between downlink data and acknowledgment transmission, a timing relation between downlink control channel and uplink data, and a timing relation between uplink data and earliest uplink acknowledgment transmission or uplink transmission/retransmission scheduling for a same hybrid automatic repeat request process.

Having at least one of the one or more received parameters serve to define a control channel transmission, where the one or more parameters are received from the communication network when establishing the communication connection, it can be possible to define a control channel transmission structure in a way that enables a flexible frame structure that can extend beyond explicit predefined definitions.

Figure 6:
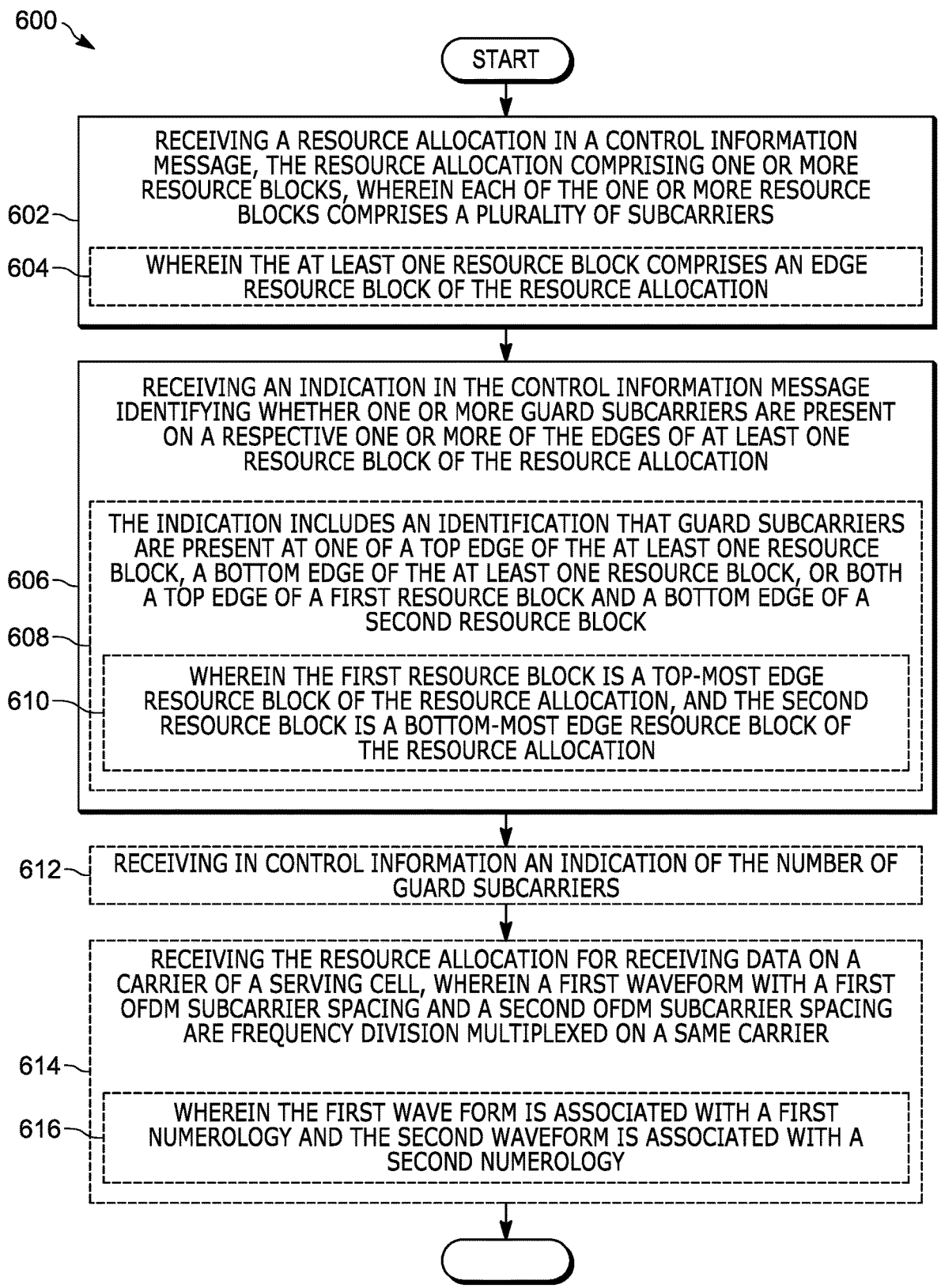
FIG. 6 is a flow diagram for receiving an indication from the communication network as to the presence of one or more guard subcarriers on various respective edges of resource blocks in a resource allocation.

FIG. 6 illustrates a flow diagram 600 for receiving an indication from the communication network as to the presence of one or more guard subcarriers on various respective edges of resource blocks in a resource allocation, in accordance with at least one embodiment. The flow diagram illustrates the operation of a wireless communication device, such as the UE 110, according to at least one possible embodiment. At 602, a resource allocation is received 602 in a control information message, the resource allocation comprising one or more resource blocks, wherein each of the one or more resource blocks comprises a plurality of subcarriers. In at least some instances, the at least one resource block can be an edge resource block of the resource allocation 604.

An indication in the control information message identifying whether one or more guard subcarriers are present is then received 606 on a respective one or more of the edges of at least one resource block of the resource allocation. In at least some instances, the indication in the control information message as to whether one or more guard subcarriers are present, includes an identification 608 that guard subcarriers are present at one of a top edge of the at least one resource block, a bottom edge of the at least one resource block, or both a top edge of a first resource block of the at least one resource block and a bottom edge of a second resource block of the at least one resource block. In at least some instances, the first resource block can be a top-most edge resource block of the resource allocation, and the second resource block can be a bottom-most edge resource block of the resource allocation 610.

In at least some instances, an indication of the number of guard subcarriers can be received 612 in control information. In some of these instances, the number of guard subcarriers can be selected to be an identified ratio of the number of guard subcarriers to the number of allocated subcarriers in the resource allocation. Further, in at least some instances, the control information can be included in the control information message. Still further, in at least some instances, the control information can be included in a received broadcast channel. Further yet, in at least some instances, the control information can be included in a higher layer control information message, wherein the higher layer is above a physical layer.

In at least some instances, the resource allocation can be received 614 for receiving data on a carrier of a serving cell, wherein a first waveform with a first orthogonal frequency division multiplexing (OFDM) subcarrier spacing and a second waveform with a second OFDM subcarrier spacing are frequency division multiplexed on a same carrier. In such an instance, the first waveform with the first OFDM subcarrier spacing can be associated with a first numerology, and the second waveform with the second OFDM subcarrier spacing can be associated with a second numerology 616. In at least some instances, the first numerology and the second numerology can include a separately defined symbol size. Further, each of the first numerology and the second numerology can include one or more of a separately defined subcarrier spacing, a separately defined length of cyclic prefix, and a separately defined pilot structure.

It is further possible that a symbol size for a first numerology can be an integer multiple of a symbol size for a second numerology. Still further, it is possible that assistance signaling can be received so that the numerology being used by a neighboring cell on the carrier can be determined. Further yet, it is possible that the use of multiple numerologies on the carrier for the serving cell and a neighboring cell are coordinated, such that each cell can indicates a preferred resource block range for transmission using a numerology of the multiple numerologies. Still further, it is possible that the preferred resource block range for transmission between different numerologies in the serving or neighboring cell can be different. In some instances, a default set of values for a default numerology for one or more of the first numerology and the second numerology can be dependent upon the carrier frequency band, wherein the same carrier can be subdivided into multiple subcarrier groupings, where each subcarrier grouping can have different default values.

It should be understood that, notwithstanding the particular steps as shown in the figures, a variety of additional or different steps can be performed depending upon the embodiment, and one or more of the particular steps can be rearranged, repeated or eliminated entirely depending upon the embodiment. Also, some of the steps performed can be repeated on an ongoing or continuous basis simultaneously while other steps are performed. Furthermore, different steps can be performed by different elements or in a single element of the disclosed embodiments.

Figure 7:
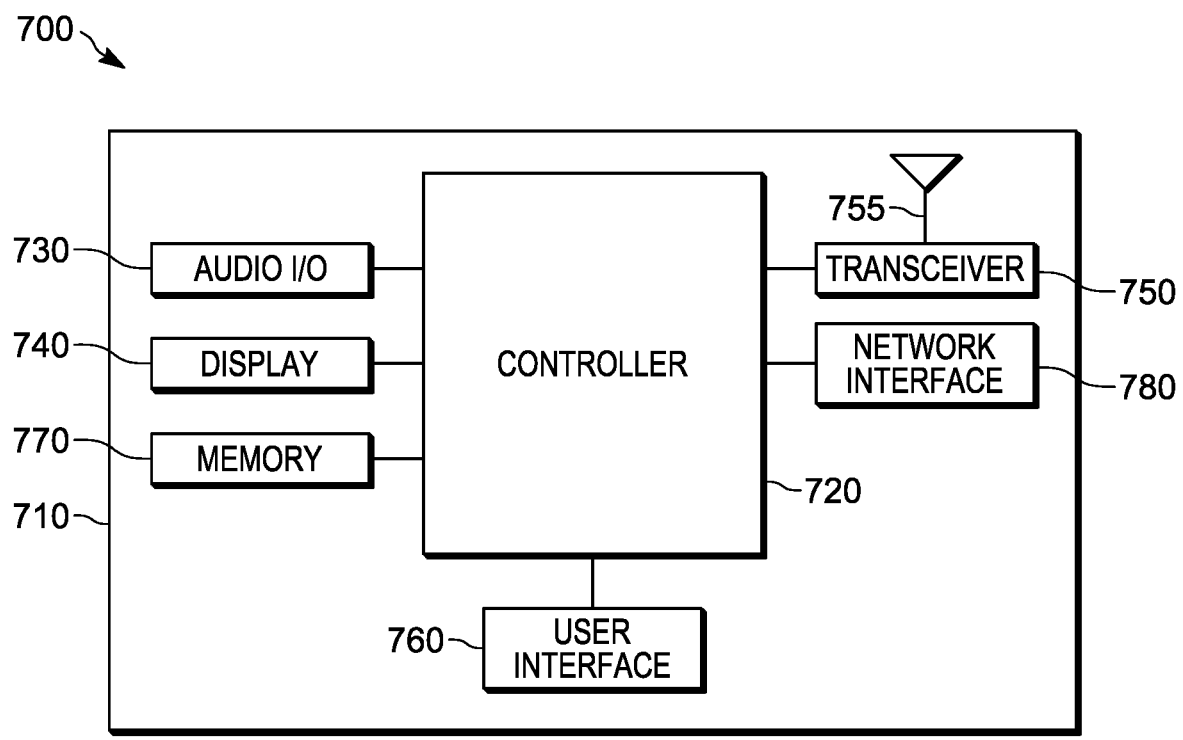
FIG. 7 is an example block diagram of an apparatus according to a possible embodiment.

FIG. 7 is an example block diagram of an apparatus 700, such as the wireless communication device 110, according to a possible embodiment. The apparatus 700 can include a housing 710, a controller 720 within the housing 710, audio input and output circuitry 730 coupled to the controller 720, a display 740 coupled to the controller 720, a transceiver 750 coupled to the controller 720, an antenna 755 coupled to the transceiver 750, a user interface 760 coupled to the controller 720, a memory 770 coupled to the controller 720, and a network interface 780 coupled to the controller 720. The apparatus 700 can perform the methods described in all the embodiments The display 740 can be a viewfinder, a liquid crystal display (LCD), a light emitting diode (LED) display, a plasma display, a projection display, a touch screen, or any other device that displays information. The transceiver 750 can include a transmitter and/or a receiver. The audio input and output circuitry 730 can include a microphone, a speaker, a transducer, or any other audio input and output circuitry. The user interface 760 can include a keypad, a keyboard, buttons, a touch pad, a joystick, a touch screen display, another additional display, or any other device useful for providing an interface between a user and an electronic device. The network interface 780 can be a Universal Serial Bus (USB) port, an Ethernet port, an infrared transmitter/receiver, an IEEE 1394 port, a WLAN transceiver, or any other interface that can connect an apparatus to a network, device, or computer and that can transmit and receive data communication signals. The memory 770 can include a random access memory, a read only memory, an optical memory, a solid state memory, a flash memory, a removable memory, a hard drive, a cache, or any other memory that can be coupled to an apparatus.

The apparatus 700 or the controller 720 may implement any operating system, such as Microsoft Windows®, UNIX®, or LINUX®, Android™, or any other operating system. Apparatus operation software may be written in any programming language, such as C, C++, Java or Visual Basic, for example. Apparatus software may also run on an application framework, such as, for example, a Java® framework, a .NET® framework, or any other application framework. The software and/or the operating system may be stored in the memory 770 or elsewhere on the apparatus 700. The apparatus 700 or the controller 720 may also use hardware to implement disclosed operations. For example, the controller 720 may be any programmable processor. Disclosed embodiments may also be implemented on a general-purpose or a special purpose computer, a programmed microprocessor or microprocessor, peripheral integrated circuit elements, an application-specific integrated circuit or other integrated circuits, hardware/electronic logic circuits, such as a discrete element circuit, a programmable logic device, such as a programmable logic array, field programmable gate-array, or the like. In general, the controller 720 may be any controller or processor device or devices capable of operating an apparatus and implementing the disclosed embodiments. Some or all of the additional elements of the apparatus 700 can also perform some or all of the operations of the disclosed embodiments.

The method of this disclosure can be implemented on a programmed processor. However, the controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device on which resides a finite state machine capable of implementing the flowcharts shown in the figures may be used to implement the processor functions of this disclosure.

While this disclosure has been described with specific embodiments thereof, it is evident that many alternatives, modifications, and variations will be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

In this document, relational terms such as "first," "second," and the like may be used solely to distinguish one entity or action from another entity or action without necessarily requiring or implying any actual such relationship or order between such entities or actions. The phrase "at least one of," "at least one selected from the group of," or "at least one selected from" followed by a list is defined to mean one, some, or all, but not necessarily all of, the elements in the list. The terms "comprises," "comprising," "including," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising." Furthermore, the background section is written as the inventor's own understanding of the context of some embodiments at the time of filing and includes the inventor's own recognition of any problems with existing technologies and/or problems experienced in the inventor's own work.

What is claimed is:

1. A method in a user equipment comprising:
    establishing a communication connection with a communication network via an access point including receiving information for defining a format of the communication connection, whereby the format to be used as part of the communication connection includes one or more parameters which are received from the communication network when establishing the communication connection, wherein at least one of the one or more received parameters serve to define a structure of a downlink control channel transmission to be used within a defined downlink channel; and
    receiving a downlink control channel including one or more downlink control channel transmissions in support of the established communication connection, based upon the structure of the downlink control channel transmission defined by the at least one of the one or more received parameters.

2. A method in accordance with claim 1, wherein the at least one of the one or more received parameters, which serve to define the structure of the downlink control channel transmission to be used within the defined downlink channel includes one or more parameters, which define a periodicity value for a series of downlink control channel transmissions and a time-frequency domain length value for each transmission of the one or more downlink control channel transmissions.

3. A method in accordance with claim 2, wherein the periodicity value comprises an integer multiple of subframes where a subframe comprises a plurality of orthogonal frequency division multiplexing (OFDM) symbols, and the time-frequency domain length value comprises a set of OFDM symbols and a set of physical resource blocks; and wherein at least one of the set of OFDM symbols, number of OFDM symbols, the set of physical resource blocks, and number of physical resource blocks is different from a first subframe of the downlink control channel transmission to a second subframe of the downlink control channel transmission.

4. A method in accordance with claim 1, wherein the at least one of the one or more received parameters, which serve to define the structure of the downlink control channel transmission to be used within the defined downlink channel includes one or more parameters, which define an OFDM subcarrier spacing value used for receiving downlink control channel transmissions.

5. A method in accordance with claim 1, wherein the at least one of the one or more received parameters, which serve to define the structure of the downlink control channel transmission to be used within the defined downlink channel includes one or more parameters, which define a cyclic prefix value associated with the downlink control channel.

6. A method in accordance with claim 1, wherein the at least one of the one or more received parameters, which serve to define the structure of the downlink control channel transmission to be used within the defined downlink channel includes one or more parameters, which indicate whether the downlink control channel can be received based on a single antenna port or whether the downlink control channel can be received based on multiple antenna ports.

7. A method in accordance with claim 1, wherein establishing the communication connection with the communication network via the access point includes receiving a broadcast channel while performing an initial access procedure with the communication network, wherein at least some of the information for defining the format of the communication connection including the structure of the downlink control channel transmission is determined from the received broadcast channel.

8. A method in accordance with claim 7, wherein a numerology for receiving downlink control channel transmissions is different from a numerology used for receiving the broadcast channel, wherein a numerology comprises one or more of a subcarrier spacing and a cyclic prefix length.

9. A method in accordance with claim 7, further comprising determining from the broadcast channel, a set of time-domain resources where downlink transmissions are not present.

10. A method in accordance with claim 7, further comprising determining from the broadcast channel, a set of time-domain resources for uplink transmission.

11. A method in accordance with claim 7, wherein receiving the broadcast channel comprises determining an OFDM subcarrier spacing value used for receiving the broadcast channel, wherein the OFDM subcarrier spacing value is determined based on the operating band in which the broadcast channel is received.

12. A method in accordance with claim 7, further comprising receiving the broadcast channel using a first set of reference signal transmissions; receiving the downlink control channel using a second set of reference signal transmissions, wherein the first and second set of reference signal transmissions are transmitted on different antenna ports.

13. A method in accordance with claim 12, further comprising receiving the first set of reference signal transmissions within OFDM symbols comprising the broadcast channel.

14. A method in accordance with claim 1, wherein establishing the communication connection with the communication network via the access point includes receiving at least some of the information for defining the format of the communication connection including the structure of the downlink control channel transmission, which is determined from one or more parameters included as part of control information received from a downlink control channel transmission related to a target access point in anticipation of a possible handover to the target access point.

15. A method in accordance with claim 1, wherein establishing the communication connection with the communication network via the access point includes reconfiguring a previously established communication connection, where the reconfiguration allows for the format to be used as part of the communication connection to be modified, so as to define a different format having a different downlink control channel transmission structure.

16. A method in accordance with claim 1, wherein the at least one of the one or more received parameters which serve to define the structure of the downlink control channel transmission vary from a first time instance of the downlink control channel transmission to a second time instance of the downlink control channel transmission based on a predetermined pattern.

17. A method in accordance with claim 16, wherein the predetermined pattern is based on one or more of identification information determined from a received synchronization signal, and at least one of the one or more received parameters that is not varying based on the predetermined pattern.

18. A method in accordance with claim 1, further comprising receiving on the downlink control channel information regarding default numerology for at least one of downlink control channel scheduling data, or data transmission; wherein the default numerology comprises a default subcarrier spacing and a default cyclic prefix length.

19. A method in accordance with claim 18, wherein the default numerology for downlink transmissions from the access point to the user equipment is different than the default numerology for uplink transmissions from the user equipment to the access point.

20. A method in accordance with claim 1, further comprising receiving on the downlink control channel information regarding one or more preconfigured timing relation parameters for data transmission, wherein the preconfigured timing relation parameters includes at least one from the set of a timing relation between downlink control channel and downlink data, a timing relation between downlink data and acknowledgment transmission, a timing relation between downlink control channel and uplink data, and a timing relation between uplink data and earliest uplink acknowledgment transmission or uplink transmission/retransmission scheduling for a same hybrid automatic repeat request process.

21. A user equipment in a communication network, the user equipment comprising:
a transceiver that sends and receives signals between the user equipment and a communication network entity including information for defining a format of a communication connection;
a controller that identifies one or more parameters from the information for defining the format of the communication connection, wherein at least one of the one or more received parameters serve to define a structure of a downlink control channel transmission to be used within a defined downlink channel; and
wherein the transceiver receives a downlink control channel as part of the communication connection, the downlink control channel including one or more downlink control channel transmissions in support of the communication connection, based upon the structure of the downlink control channel transmission defined by the at least one of the one or more received parameters.

22. A user equipment in accordance with claim 21, wherein the at least one of the one or more parameters that serve to define the structure of the downlink control channel transmission include at least one of
a) a periodicity value for a series of downlink control channel transmissions and a time-frequency domain length value for each transmission of the one or more downlink control channel transmissions;
b) an OFDM subcarrier spacing value used for receiving downlink control channel transmissions;
c) a cyclic prefix value associated with the downlink control channel; and
d) a parameter indicating whether the downlink control channel can be received based on a single antenna port or whether the downlink control channel can be received based on multiple antenna ports.

23. A user equipment in accordance with claim 21, wherein the transceiver receives a broadcast channel while performing an initial access procedure with the communication network, wherein at least some of the information for defining the format of the communication connection including the structure of the downlink control channel transmission is determined from the received broadcast channel.

24. A user equipment in accordance with claim 21, wherein the transceiver receives at least some of the information for defining the format of the communication connection including the structure of the downlink control channel transmission, which is determined by the controller from one or more parameters included as part of control information received from a downlink control channel transmission related to a target access point in anticipation of a possible handover to the target access point.

25. A user equipment in accordance with claim 21, wherein the controller reconfigures a previously established communication connection, where the reconfiguration allows for the format to be used as part of the communication connection to be modified, so as to define a different format having a different downlink control channel transmission structure.

* * * * *